United States Patent
Sakurai

(10) Patent No.: US 11,625,886 B2
(45) Date of Patent: Apr. 11, 2023

(54) STORAGE MEDIUM STORING PROGRAM, TRAINING METHOD OF MACHINE LEARNING MODEL, AND IMAGE GENERATING APPARATUS

(71) Applicant: BROTHER KOGYO KABUSHIKI KAISHA, Nagoya (JP)

(72) Inventor: Koichi Sakurai, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 17/178,355

(22) Filed: Feb. 18, 2021

(65) Prior Publication Data

US 2021/0304487 A1 Sep. 30, 2021

(30) Foreign Application Priority Data

Mar. 30, 2020 (JP) .............................. JP2020-059786

(51) Int. Cl.
| | |
|---|---|
| *G06T 15/02* | (2011.01) |
| *G06T 3/40* | (2006.01) |
| *G06T 7/13* | (2017.01) |

(52) U.S. Cl.
CPC .............. *G06T 15/02* (2013.01); *G06T 3/40* (2013.01); *G06T 7/13* (2017.01); *G06T 2207/20021* (2013.01); *G06T 2207/20081* (2013.01)

(58) Field of Classification Search
CPC ............ G06T 15/02; G06T 7/13; G06T 3/40; G06T 2207/20021; G06T 2207/20081; G06T 11/001
See application file for complete search history.

(56) References Cited

U.S. PATENT DOCUMENTS

| 10,664,963 B1 * | 5/2020 | Rossi ..................... G06V 10/40 |
| 10,740,939 B1 * | 8/2020 | Chung ..................... G06N 3/04 |

(Continued)

FOREIGN PATENT DOCUMENTS

| JP | 2003-203221 A | 7/2003 |
| JP | 2004-102819 A | 4/2004 |

(Continued)

OTHER PUBLICATIONS

Gatys et al; "Image Style Transfer Using Convolutional Neural Networks"; 2016; Proceedings of the IEEE Conference on Computer Vision and Pattern Recognition (CVPR); pp. 2414-2423 (Year: 2016).*

(Continued)

*Primary Examiner* — Yingchun He
(74) *Attorney, Agent, or Firm* — Scully, Scott, Murphy & Presser, PC

(57) ABSTRACT

A non-transitory computer-readable storage medium storing a set of program instructions for an image generating apparatus is disclosed. The set of program instructions, when executed by a controller of the image generating apparatus, causes the image generating apparatus to perform: acquiring input image data; and executing a style transfer process on the input image data by using a trained machine learning model, thereby generating transferred image data. The machine learning model is trained by using a plurality of data pairs each including content image data and style image data corresponding to the content image data. The style image data is generated by executing particular image processing on the corresponding content image data. The particular image processing is a process of applying a particular style to a content image indicated by the content image data.

20 Claims, 8 Drawing Sheets

(56) References Cited

U.S. PATENT DOCUMENTS

| | | | |
|---|---|---|---|
| 10,762,650 B1* | 9/2020 | Guo | G06T 5/001 |
| 2013/0329991 A1 | 12/2013 | Nashizawa | |
| 2018/0068463 A1* | 3/2018 | Risser | G06T 7/45 |
| 2018/0096454 A1* | 4/2018 | Amirghodsi | G06T 3/4053 |
| 2018/0285679 A1* | 10/2018 | Amitay | G06T 11/001 |
| 2018/0322662 A1* | 11/2018 | Hellier | G06T 11/001 |
| 2018/0350030 A1* | 12/2018 | Simons | G06T 5/002 |
| 2019/0244329 A1* | 8/2019 | Li | G06N 3/088 |
| 2020/0065940 A1* | 2/2020 | Tang | G06T 5/002 |
| 2020/0082249 A1* | 3/2020 | Hua | G06T 11/001 |
| 2020/0151938 A1* | 5/2020 | Shechtman | G06N 3/0454 |
| 2020/0202502 A1* | 6/2020 | Tsymbalenko | G06T 5/50 |
| 2020/0258204 A1* | 8/2020 | Fang | G06T 3/0012 |
| 2020/0342570 A1* | 10/2020 | Yuan | G06T 3/0093 |
| 2020/0380652 A1* | 12/2020 | Olaleye | G06N 3/088 |
| 2021/0142478 A1* | 5/2021 | Abhinav | G06N 20/00 |
| 2021/0150684 A1* | 5/2021 | Elmoznino | G06N 3/0454 |
| 2021/0233239 A1* | 7/2021 | Li | G06T 7/0014 |

FOREIGN PATENT DOCUMENTS

| | | | |
|---|---|---|---|
| JP | 2013-254390 A | 12/2013 | |
| JP | 2018-132855 A | 8/2018 | |

OTHER PUBLICATIONS

Li, Ming et al., "High-Resolution Network for Photorealistic Style Transfer", JMLR: Workshop and Conference Proceedings 101 (Apr. 25, 2019), pp. 1-14.

\* cited by examiner

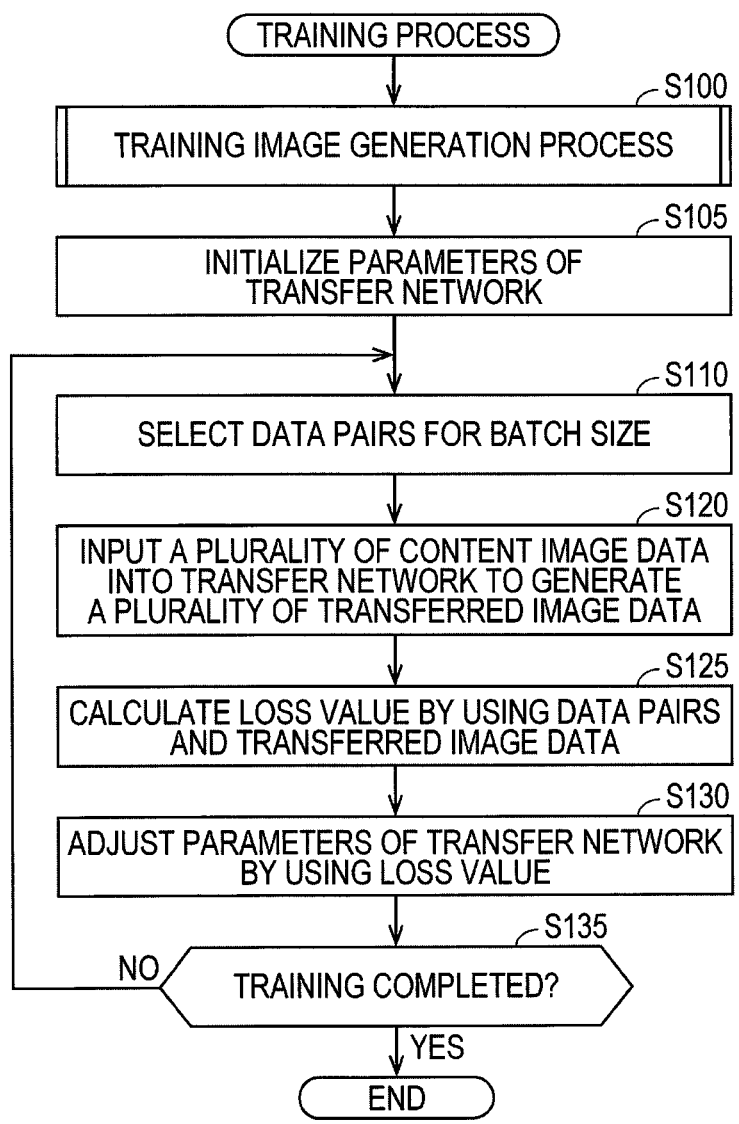

ORIGINAL IMAGE

EDGE IMAGE

COLOR-REDUCED IMAGE

PROCESSED IMAGE

STORAGE MEDIUM STORING PROGRAM, TRAINING METHOD OF MACHINE LEARNING MODEL, AND IMAGE GENERATING APPARATUS

CROSS REFERENCE TO RELATED APPLICATIONS

This application claims priority from Japanese Patent Application No. 2020-059786 filed Mar. 30, 2020. The entire content of the priority application is incorporated herein by reference.

TECHNICAL FIELD

This disclosure relates to a style transfer process for image data.

BACKGROUND

Techniques for transferring image styles such as styles of images are known. For example, an image processing apparatus executes a process of binarizing an image showing a photograph based on brightness and a process of performing edge extraction to set the outline of the original image to black. The image processing apparatus superimposes the binarized image and the image whose outline is set to black to generate an illustrated image.

SUMMARY

According to one aspect, this specification discloses a non-transitory computer-readable storage medium storing a set of program instructions for an image generating apparatus. The set of program instructions, when executed by a controller of the image generating apparatus, causes the image generating apparatus to perform: acquiring input image data; and executing a style transfer process on the input image data by using a trained machine learning model, thereby generating transferred image data. The machine learning model is trained by using a plurality of data pairs each including content image data and style image data corresponding to the content image data. The style image data is generated by executing particular image processing on the corresponding content image data. The particular image processing is a process of applying a particular style to a content image indicated by the content image data.

According to another aspect, this specification also discloses a training method of a machine learning model configured to execute a style transfer process on input image data to generate transferred image data. The method includes: acquiring original image data; generating processed image data corresponding to the original image data, the processed image data being generated by executing particular image processing on the original image data, the particular image processing being a process of applying a particular style to an image indicated by the original image data; acquiring a plurality of style image data based on the processed image data; acquiring a plurality of content image data based on the original image data, the plurality of content image data corresponding to respective ones of the plurality of style image data; and adjusting a plurality of parameters of the machine learning model by using a plurality of data pairs, each of the plurality of data pairs including one of the plurality of content image data and a corresponding one of the plurality of style image data.

According to still another aspect, this specification also discloses an image generating apparatus. The image generating apparatus includes a controller and a memory storing instructions. The instructions, when executed by the controller, cause the image generating apparatus to perform: acquiring target image data indicating a target image; dividing the target image into a plurality of portions to acquire, as input image data, a plurality of partial image data indicating the plurality of portions; inputting each of the plurality of partial image data to a machine learning model to generate a plurality of transferred partial image data corresponding to the plurality of partial image data, the machine learning model being a model configured to execute a style transfer process of applying a particular style to an image indicated by the input image data; and generating output image data indicating an output image by using the plurality of transferred partial image data, the output image being obtained by applying the particular style to the target image.

The techniques disclosed in this specification can be realized in various forms, for example, a training method of a machine learning model, an image generation method, an apparatus and a computer program for realizing these methods, and a storage medium storing the computer program.

BRIEF DESCRIPTION OF THE DRAWINGS

Embodiments in accordance with this disclosure will be described in detail with reference to the following figures wherein:

FIG. 3 is a flow chart of a training process;

DETAILED DESCRIPTION

Figure 1:
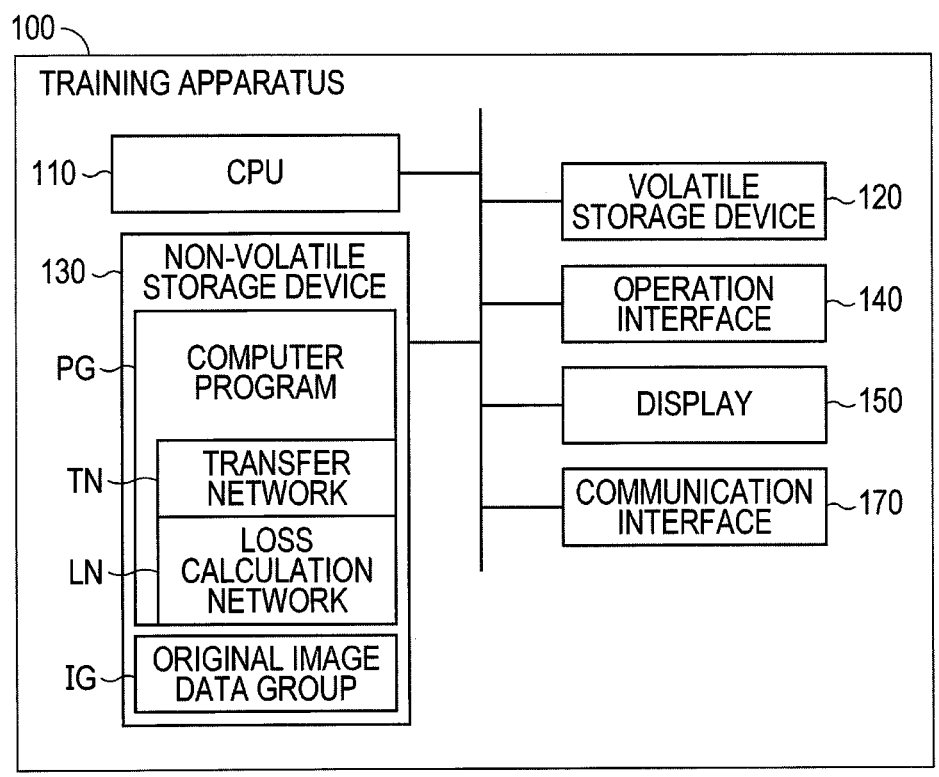
FIG. 1 is a block diagram showing a configuration of a training apparatus 100 of an embodiment.

In such image style transfer, for example, a transferred image may have an unnatural appearance depending on the image.

In view of the foregoing, an aspect of an objective of this specification is to disclose a new technique that improves the appearance of an image for which a style is transferred.

A. Embodiment

A-1. Configuration of Training Apparatus

An embodiment will be described while referring to the drawings.

As shown in FIG. 1, a training apparatus 100 is a computer such as a personal computer. The training apparatus 100 includes a CPU 110 as a controller of the training apparatus 100, a volatile storage device 120 such as RAM, a non-volatile storage device 130 such as a hard disk drive and a flash memory, an operation interface 140, a display 150, and a communication interface (IF) 170. The operation interface 140 is a device that receives a user's operation, such as a keyboard and a mouse. The display 150 is a device for displaying an image, and is, for example, a liquid crystal display. The communication interface 170 is an interface for connecting with an external device.

The volatile storage device 120 provides a buffer area for temporarily storing various intermediate data generated when the CPU 110 performs processing. The non-volatile storage device 130 stores a computer program PG and an original image data group IG. The original image data group IG includes a plurality of original image data used for a training process described later. The original image data is, for example, bitmap data generated by photographing a subject (for example, a person) with a digital camera. In this embodiment, the original image data is RGB image data that represents the color of each pixel by RGB values. The RGB values are color values in the RGB color system including an R value, a G value, and a B value, which are gradation values (for example, 256 gradation values) of three color components of red (R), green (G), and blue (B).

The computer program PG is provided, for example, by the manufacturer of a printer described later, and is installed in the training apparatus 100. The computer program PG may be provided in a form downloaded from a particular server or stored in a CD-ROM, a DVD-ROM, and so on. By executing the computer program PG, the CPU 110 executes the training process of a transfer network TN described later.

The computer program PG includes, as a module, a computer program that enables the CPU 110 to realize the functions of the transfer network TN and a loss calculation network LN, which will be described later.

A-2. Structure of Machine Learning Model

Figure 2A:
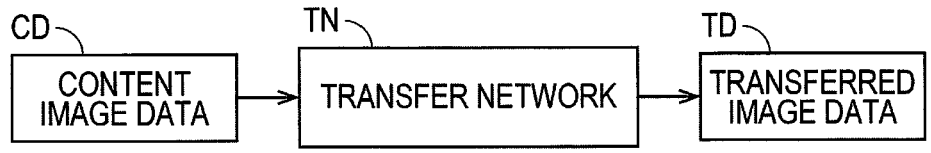
FIGS. 2A to 2C are explanatory diagrams showing a machine learning model.
Figure 2B:
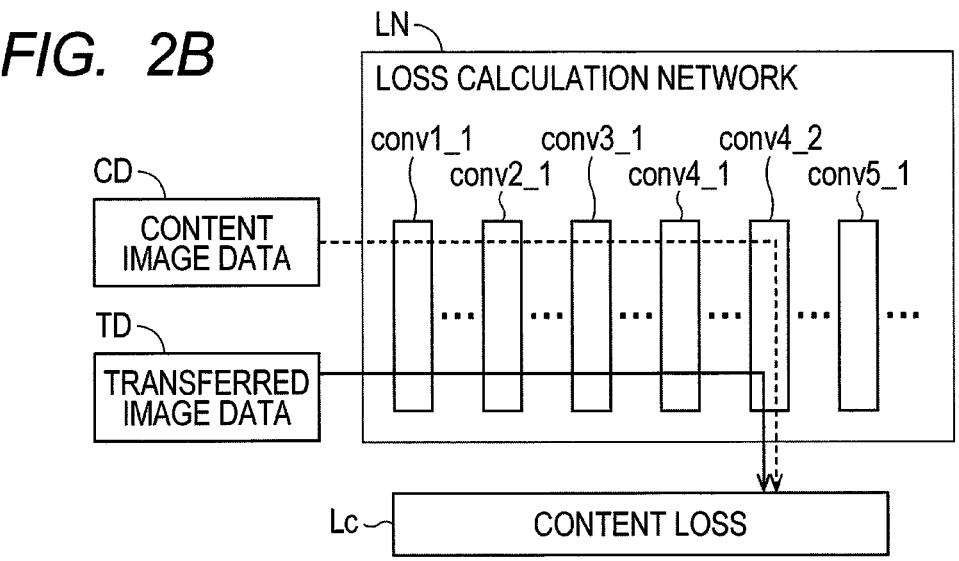
Figure 2C:
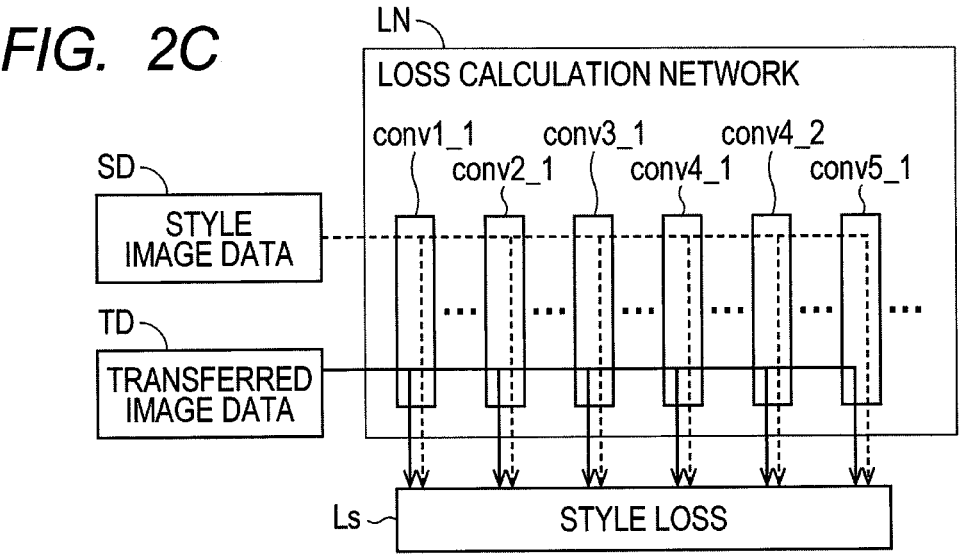

The machine learning model used in this embodiment includes the transfer network TN of FIG. 2A and the loss calculation network LN of FIGS. 2B and 2C. The transfer network TN is a machine learning model that performs style transfer. The loss calculation network LN is a machine learning model used to calculate the loss when training the transfer network TN. These networks are disclosed in the paper "M. Li, C. Ye, and W. Li. High-resolution network for photorealistic style transfer. CoRR, abs/1904.11617, 2019."

When content image data CD is input, the transfer network TN executes an operation using a plurality of calculation parameters on the content image data CD to generate and output transferred image data TD. The transferred image data TD is data indicating a transferred image obtained by applying a particular style (for example, a style or feature of a painting such as an illustration) to a content image (for example, a photographic image). For example, a transferred image is an image having a particular style while maintaining the shape of the content image (for example, the shape of an object such as a person).

The particular style is a style of a style image indicated by style image data SD described later. In the training process described later, a plurality of parameters of the transfer network TN are adjusted by using the content image data CD and the style image data SD. As a result, the transfer network TN is trained to output the transferred image data TD indicating a transferred image obtained by applying a particular style of the style image to the content image.

In this embodiment, the content image data CD, the style image data SD, and the transferred image data TD are RGB image data. The sizes of the images represented by these image data CD, SD, and TD are equal to each other, and the size is 500 pixels vertically and 500 pixels horizontally, for example.

The transfer network TN is a neural network called a High-Resolution network. The transfer network TN performs a convolution operation to generate a high-resolution feature map without lowering the resolution of the inputted content image data CD. In parallel, the transfer network TN performs a convolution operation to reduce the resolution to generate one or more low resolution feature maps. In this embodiment, the content image data CD is image data of (500×500) pixels, and the high-resolution feature map is a map having a resolution equivalent to (500×500) pixels. The low-resolution feature map is a map having a resolution equivalent to (250×250) pixels and (125×125) pixels. The transfer network TN generates a feature map while exchanging information between the high-resolution feature map and the low-resolution feature map. The transfer network TN generates the transferred image data TD by reconstructing the image data based on the feature map generated in this way. Filter weights and biases used in the convolution operation performed by the transfer network TN are parameters adjusted by the training process described later.

As the loss calculation network LN, the portion of the 19-layer convolutional neural network called VGG19 excluding fully connected layers is used as it is. The VGG19 is a trained neural network trained using image data registered in an image database called ImageNet, and its trained parameters are open to the public.

The loss calculation network LN (VGG19) includes 16 convolution layers called conv1_1, conv1_2, conv2_1, conv2_2, conv3_1, conv3_2, conv3_3, conv3_4, conv4_1, conv4_2, conv4_3, conv4_4, conv5_1, conv52, conv5_3, and conv5_4. The convolution layer is a layer that performs a convolution process and a bias addition process. Of these convolutional layers, FIGS. 2B and 2C show conv1_1, conv2_1, conv3_1, conv4_1, conv4_2, and conv5_1 whose output is used for loss calculation. In FIGS. 2B and 2C, the other convolution layer, the input layer, and the pooling layer are not shown. The loss calculation using the loss calculation network LN will be described later.

A-3. Training Process of Transfer Network TN

As shown in FIG. 3, the training process is executed by the CPU 110 of the training apparatus 100 by executing the computer program PG.

In S100, the CPU 110 executes a training image generation process. The training image generation process is a process of generating a plurality of data pairs for training the transfer network TN. Each data pair is a pair of the content image data CD and the style image data SD.

Figure 4:
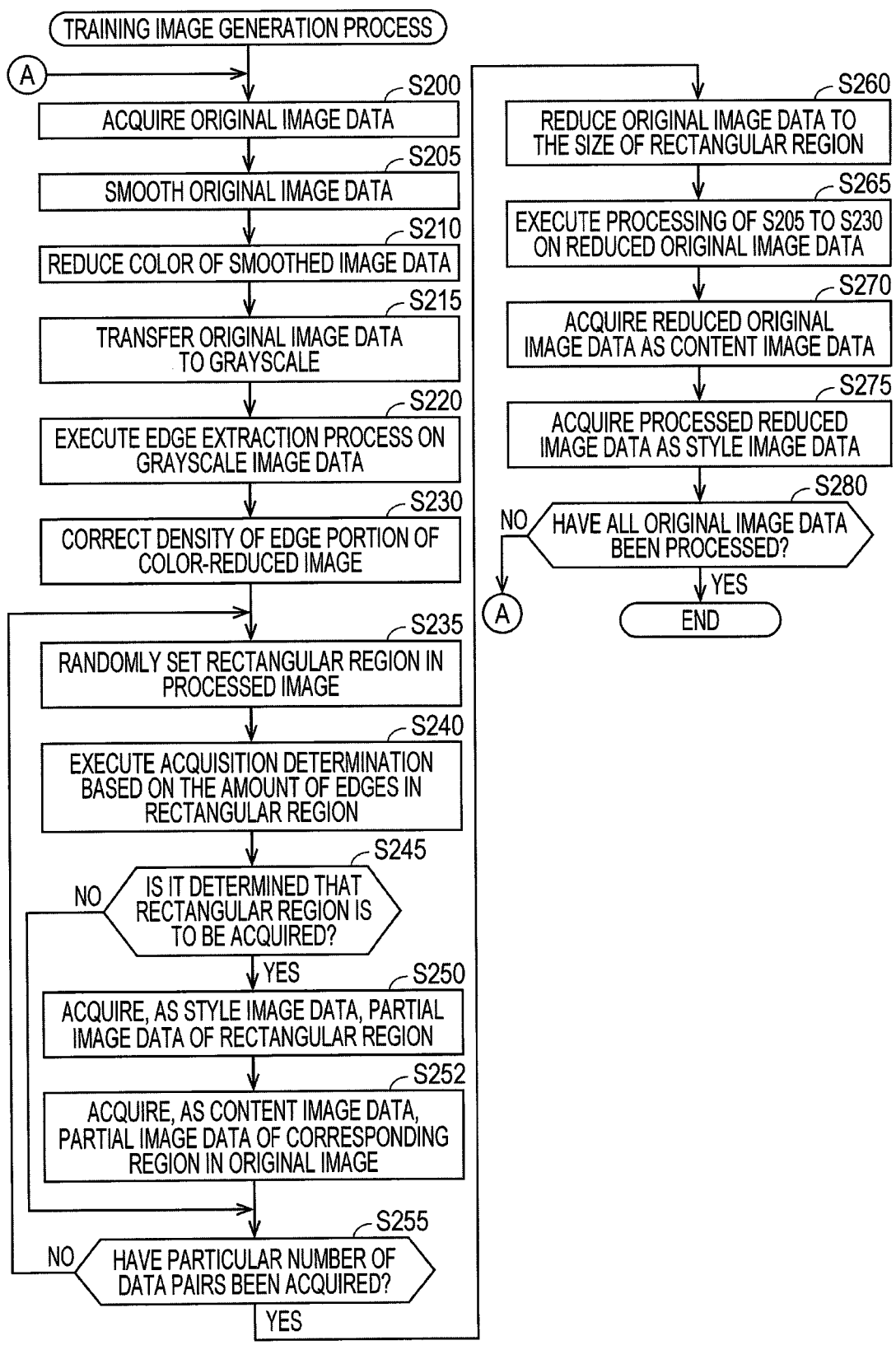
FIG. 4 is a flow chart of a training image generation process.

As shown in FIG. 4, in S200, the CPU 110 acquires one original image data to be processed from the original image data group IG stored in the non-volatile storage device 130.

Figure 5A:
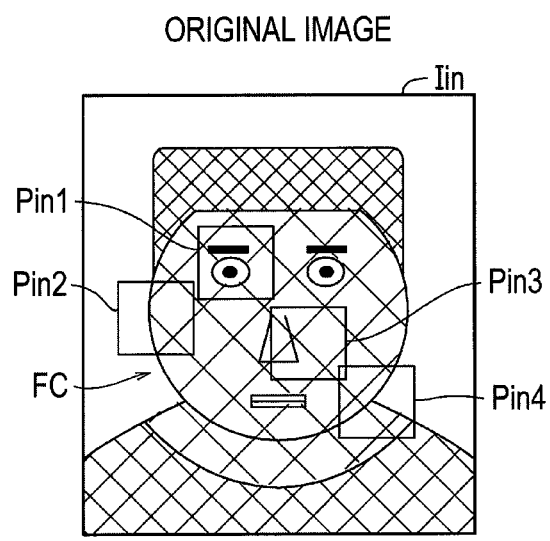
FIGS. 5A to 5D are diagrams showing an example of images used in the training process.

An original image Iin in FIG. 5A is an example of an image represented by original image data. The original image Iin is a photographic image including a face FC of a person. The size of the original image Iin is larger than the size of the image indicated by the image data CD and the style image data SD described above. For example, the number of pixels of the original image Iin in the vertical direction and the horizontal direction is 2000 to 6000 pixels.

The CPU 110 generates the processed image data by executing the image processing of S205 to S230 by using the original image data. The image processing of S205 to S230 is processing of transferring the original image Iin, which is a photographic image, to an illustration-like image.

In S205, the CPU 110 smooths the original image data to generate smoothed image data indicating a smoothed image. As the smoothing process, a known process, for example, a process of applying a smoothing filter such as a Gaussian filter to each pixel in the image is used. By performing the smoothing process, noise and fine components in the image are eliminated. Since an illustration generally does not include fine components such as a photograph, a photographic image can be made closer to an illustration-like image by the smoothing process.

Figure 5C:
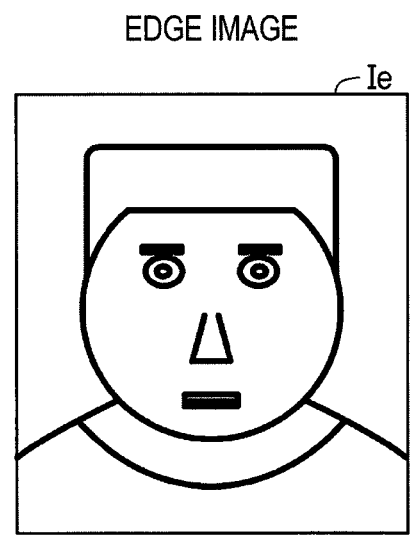
Figure 5B:
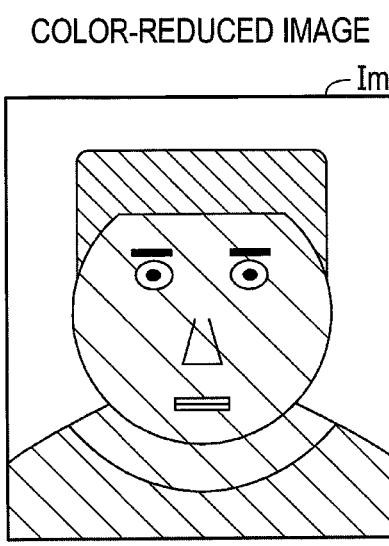

In S210, the CPU 110 reduces the color of the smoothed image data to generate color-reduced image data indicating a color-reduced image. As the color reduction process, a known process, for example, a color reduction process using a clustering algorithm such as the k-means method is used. In this embodiment, the number of colors is reduced to several tens to several hundreds. FIG. 5B shows a color-reduced image Im. Since an illustration generally has a smaller number of colors than a photograph, the photographic image can be made closer to an illustration-like image by the color reduction process.

In S215, the CPU 110 transfers (converts) the original image data to grayscale to generate grayscale image data indicating a grayscale image. The transfer (conversion) to grayscale is performed, for example, by using a known formula for converting RGB values to luminance values.

In S220, the CPU 110 executes an edge extraction process on the grayscale image data to generate edge image data indicating an edge image. The edge extraction process is a process for extracting edge pixels indicating edges in an image. In the edge extraction process, for example, the edge strength of each pixel is calculated, and the pixel whose edge strength is higher than or equal to a threshold value is extracted as an edge pixel. A known edge detection operator such as a Sobel operator or a Prewitt operator is used to calculate the edge strength. FIG. 5C shows an edge image Ie. The black portion of the edge image Ie is a portion composed of the extracted edge pixels.

Figure 5D:
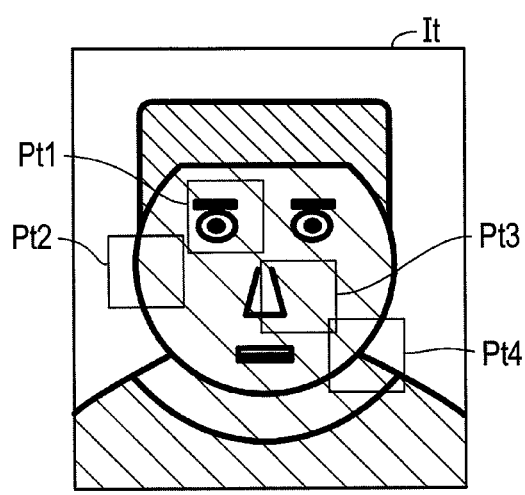

In S230, the CPU 110 executes processing of correcting the density of the edge portion of the color-reduced image Im on the color-reduced image data to generate processed image data indicating a processed image It. Specifically, the CPU 110 corrects the RGB values of the pixels of the color-reduced image Im corresponding to each edge pixel in the edge image Ie. The RGB values are corrected to increase the density of the colors indicated by the RGB values. For example, the three component values, the R value, the G value, and the B value of the RGB values are changed to smaller values by a particular ratio. Since illustrations are generally composed of lines, the edges are clearer in illustrations than in photographs. Thus, by performing the correction to increase the density of the edge portion, a photographic image can be made closer to an illustration-like image. FIG. 5D shows the processed image It.

It can be said that the processed image It is an image which is obtained by applying a particular style (illustration-like style) of this embodiment to the original image Iin.

In S235, the CPU 110 randomly sets a rectangular region Pt in the processed image It. The size of the rectangular region Pt is the size of the style image indicated by the style image data SD described above, and in this embodiment, the size of (500×500) pixels.

In S240, the CPU 110 executes acquisition determination based on the amount of edges in the rectangular region Pt. The acquisition determination is a determination as to whether to acquire the image in the rectangular region Pt as a style image. For example, the CPU 110 counts the number of edge pixels in the rectangular region Pt by using the edge image data, and acquires the count value as an edge amount. When the edge amount is greater than or equal to a threshold value THe, the CPU 110 sets a threshold value for acquisition determination to a first determination threshold value TH1. When the edge amount is less than the threshold value THe, the CPU 110 sets the threshold value for acquisition determination to a second determination threshold value TH2, which is larger than the first determination threshold value TH1. The threshold values TH1 and TH2 are values in the range of 0 to 1, and are, for example, 0.3 and 0.6, respectively. The CPU 110 acquires a random number value in the range of 0 to 1, and if the random number value is greater than the set determination threshold value, determines that the image in the rectangular region Pt is acquired as a style image. When the random number value is less than or equal to the set determination threshold value, the CPU 110 determines that the image in the rectangular region Pt is not acquired as a style image. As a result, the probability of acquiring a portion (region) including the edge in the processed image It is higher than the probability of acquiring a portion (region) not including the edge in the processed image It.

As a result of the acquisition determination, when it is determined that the image in the rectangular region Pt is acquired as a style image (S245: YES), in S250 the CPU 110 acquires, as the style image data SD, partial image data indicating the image in the rectangular region Pt from the processed image data.

In S252, the CPU 110 acquires, as the content image data CD, the partial image data indicating the image in a corresponding region Pin from the original image data. The corresponding region Pin is a region in the original image Iin corresponding to the rectangular region Pt in the processed image It. The size of the corresponding region Pin is the same as the size of the rectangular region Pt. The position of the rectangular region Pt in the processed image It is the same as the position of the corresponding region Pin in the original image Iin. For example, FIG. 5A shows corresponding regions Pin1, Pin2, Pin3, and Pin4 corresponding to the rectangular regions Pt1, Pt2, Pt3, and Pt4 of FIG. 5D. The style image data SD acquired in S250 and the content image data CD acquired in S252 are stored in the non-volatile storage device 130 as data pairs corresponding to each other. It can be said that the style image data SD is image data generated by executing the image processing of S205 to S230 on the corresponding content image data CD.

In S255, the CPU 110 determines whether a particular number of data pairs have been acquired. The particular number is, for example, several tens to several hundreds. When the particular number of data pairs have not been acquired (S255: NO), the CPU 110 returns to S235. When the particular number of data pairs are acquired (S255: YES), the CPU 110 proceeds to S260.

In S260, the CPU 110 reduces the original image data to the size of the rectangular region Pt, that is, the size of the content image or the style image. A known process such as a bilinear method or a nearest neighbor method is used to reduce the original image data.

In S265, the CPU 110 executes the image processing of S205 to S230 on the reduced original image data to generate the processed reduced image data.

In S270, the CPU 110 acquires the reduced original image data as the content image data CD. In S275, the CPU 110 acquires the processed reduced image data as the style image data SD. That is, the data pair of the reduced original image data and the processed reduced image data is stored in the non-volatile storage device 130 as a data pair of the content image data CD and the style image data SD.

In S280, the CPU 110 determines whether all the original image data included in the original image data group IG have been processed. When there is unprocessed original image data (S280: NO), the CPU 110 returns to S200. When all the original image data have been processed (S280: YES), the CPU 110 ends the training image generation process.

Figure 6:
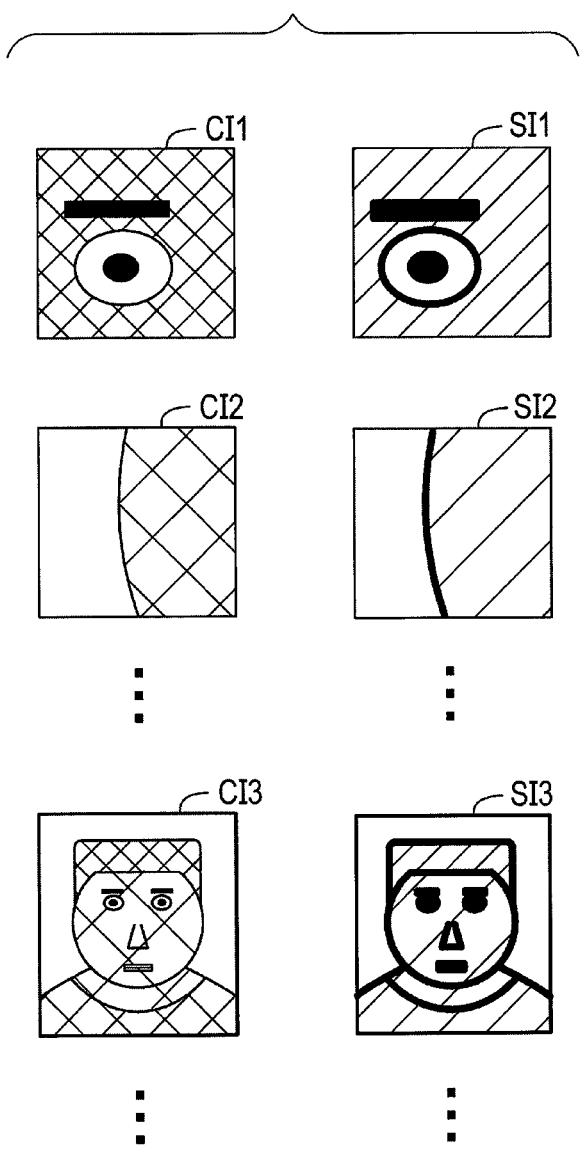
FIG. 6 shows diagrams showing an example of pairs of images indicated by data pairs.

At this point, for example, thousands of data pairs of the content image data CD and the style image data SD are generated. The content image CI1 and the style image SI1 of FIG. 6 are a pair of images represented by a data pair corresponding to the rectangular region Pt1 of the processed image It of FIG. 5D. The content image CI2 and the style image SI2 are a pair of images represented by a data pair corresponding to the rectangular region Pt2 of the processed image It in FIG. 5D. The content image CI3 and the style image SI3 are a pair of images represented by a data pair corresponding to the entire processed image It in FIG. 5D.

When the training image generation process is completed, in S105 of FIG. 3, the CPU 110 initializes a plurality of parameters of the transfer network TN. For example, the initial values of these parameters are set to random numbers obtained independently from the same distribution (for example, normal distribution).

In S110, the CPU 110 selects data pairs for a batch size from the plurality of data pairs of the content image data CD and the style image data SD generated in S100. For example, the plurality of data pairs are divided into a plurality of groups (batches) each including V sets of pairs (V is an integer of 2 or more, for example, V=100). The CPU 110 selects the V sets of data pairs to be used, by sequentially selecting one group from these plurality of groups. Alternatively, the V sets of data pairs may be randomly selected from the plurality of data pairs each time.

In S120, the CPU 110 inputs the content image data CD of the selected V sets of data pairs into the transfer network TN to generate V transferred image data TD corresponding to the V data pairs.

In S125, the CPU 110 calculates a loss value L for each data pair by using the V sets of data pairs and the corresponding V transferred image data TD. The loss function for calculating each loss value L is expressed by the following equation (1) using a content loss Lc, a style loss Ls, a TV (total variation) regularization term Ltv, and weights λc, λs, and λtv.

$$L = \lambda c \times Lc + \lambda s \times Ls + \lambda tv \times Ltv \quad (1)$$

The content loss Lc is the loss between the content image data CD and the corresponding transferred image data TD. The content loss Lc is calculated as follows. As shown in FIG. 2B, the CPU 110 inputs the content image data CD into the loss calculation network LN to generate a feature map of the content image data CD. The generated feature map is the data that is transferred by inputting the data output from the convolutional layer conv4_2 of the loss calculation network LN into an activation function. For example, a so-called ReLU (Rectified Linear Unit) is used as the activation function. Similarly, the CPU 110 inputs the transferred image data TD into the loss calculation network LN to generate a feature map of the transferred image data TD. The CPU 110 calculates, as the content loss Lc, an error value between the feature map of the content image data CD and the feature map of the transferred image data TD. For example, the square of the Euclidean distance is used as the error value between the feature maps.

The style loss Ls is the loss between the style image data SD and the corresponding transferred image data TD. The style loss Ls is calculated as follows. As shown in FIG. 2C, the CPU 110 inputs the style image data SD to the loss calculation network LN to generate a plurality (five in this embodiment) of feature maps of the style image data SD. The five feature maps generated for one style image data SD are the data which are transferred by inputting the data output from each of the convolutional layers conv1_1, conv2_1, conv3_1, conv4_1, and conv5_1 of the loss calculation network LN into an activation function. Similarly, the CPU 110 inputs the transferred image data TD into the loss calculation network LN to generate five feature maps of the transferred image data TD. The CPU 110 calculates an error value between the feature map of the style image data SD and the feature map of the transferred image data TD for each of the five feature maps. As the error value between the feature maps, for example, the square of the Frobenius norm of the difference in the Gram matrix is used. The CPU 110 calculates a weighted sum of the five error values between the feature maps as the style loss Ls.

The TV regularization term Ltv is a term calculated by using the transferred image data TD, and is a term for making the transferred image represented by the transferred image data TD a smooth image. The TV regularization term Ltv is known in the field of increasing the resolution of an image.

In S130, the CPU 110 adjusts a plurality of parameters of the transfer network TN by using the V loss values L calculated for the V sets of data pairs. Specifically, the CPU 110 adjusts the parameters according to a particular algorithm so as to reduce the loss value L. As the particular algorithm, for example, an algorithm using the backpropagation method and the gradient descent method (for example, adam) is used.

In S135, the CPU 110 determines whether the training has been completed. In this embodiment, it is determined that the training is completed when a completion instruction is input from the operator, and it is determined that the training is not completed when a continuation instruction of the training is input from the operator. For example, the CPU 110 inputs a plurality of test content image data CD different from the content image data CD used for the training into the transfer network TN to generate a plurality of transferred image data TD. The operator evaluates the transferred image data TD and determines whether to finish the training. The operator inputs a completion instruction or a continuation instruction of the training through the operation interface 140 depending on the evaluation result. In a modification, for example, it may be determined that the training is completed when the processes of S110 to S130 are repeated a particular number of times.

When it is determined that the training has not been completed (S135: NO), the CPU 110 returns the process to S110. When it is determined that the training is completed (S135: YES), the CPU 110 finishes the training of the transfer network TN. When the training ends, the transfer network TN is a trained model with adjusted parameters. Thus, it can be said that this training is a process of generating (making) a trained transfer network TN.

A-4. Image Generation Process

An image generation process executed by using a trained transfer network TN trained by using the training process described above will be described.

Figure 7:
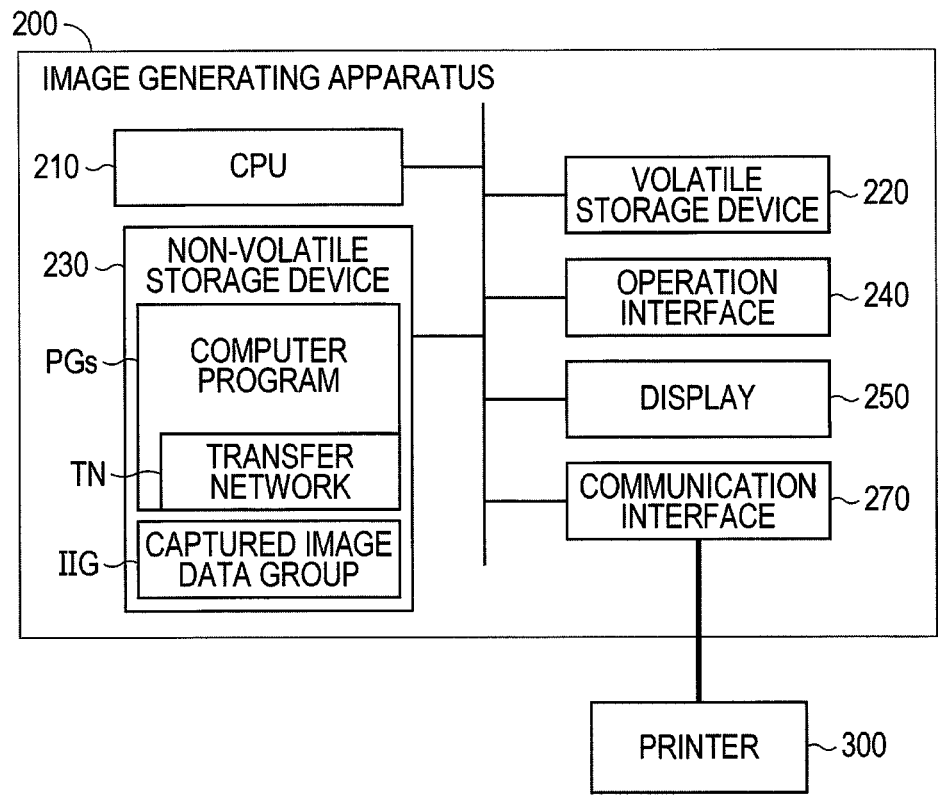
FIG. 7 is a block diagram showing a configuration of an image generating apparatus 200 of the embodiment.

An image generating apparatus 200 shown in FIG. 7 is, for example, a computer such as a personal computer or a smartphone used by a user of a printer 300. Similar to the training apparatus 100, the image generating apparatus 200 includes a CPU 210 as a controller of the image generating apparatus 200, a volatile storage device 220 such as RAM, a non-volatile storage device 230 such as a hard disk drive and a flash memory, an operation interface 240 such as a keyboard and a mouse, a display 250 such as a liquid crystal display, and a communication interface (IF) 270. The communication interface 270 is an interface for connecting with an external device, for example, the printer 300.

The non-volatile storage device 230 stores a computer program PGs and captured image data group IIG. The captured image data group IIG includes a plurality of captured image data. The captured image data is image data owned by the user, and is, for example, RGB image data generated by photographing a subject (for example, a person) using a digital camera.

The computer program PGs is, for example, an application program provided by the manufacturer of the printer 300 and is installed in the image generating apparatus 200. The computer program PGs is provided in a form downloaded from a particular server or stored in a CD-ROM, a DVD-ROM, and so on. The CPU 210 executes an image generation process described later by executing the computer program PGs.

The computer program PGs includes, as a module, a computer program that causes the CPU 210 to realize the trained transfer network TN. Since the loss calculation network LN is not used in the image generation process, the computer program PGs does not include a module for realizing the loss calculation network LN.

Figure 8:
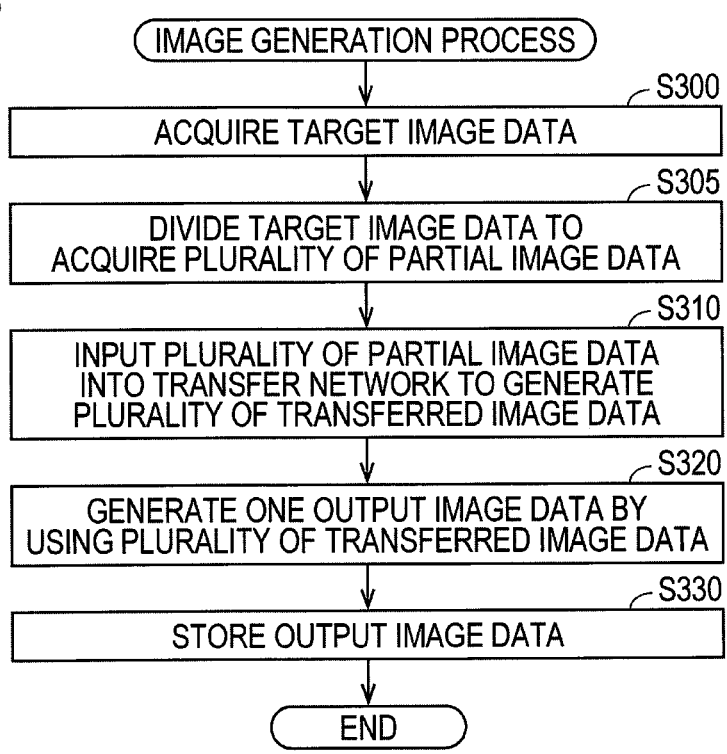
FIG. 8 is a flow chart of an image generation process.
Figure 9A:
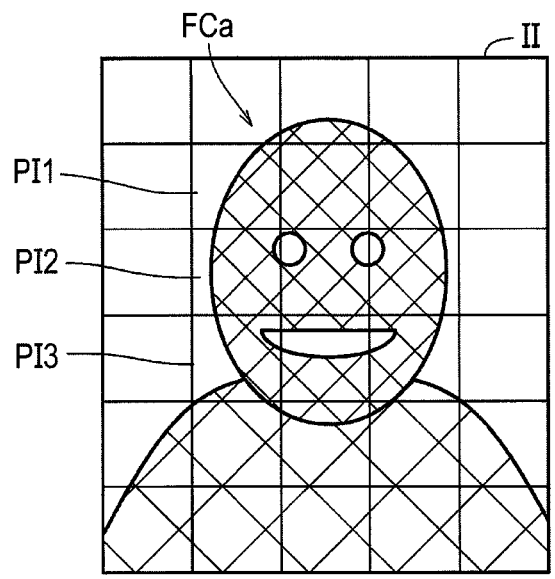
FIGS. 9A and 9B are diagrams showing an example of images used in the image generation process.

In the image generation process of FIG. 8, in S300, the CPU 210 acquires target image data. For example, from the captured image data group IIG stored in the non-volatile storage device 230, one captured image data designated by the user is acquired as the target image data. FIG. 9A shows a target image II represented by the target image data. The target image II is, for example, a photographic image including a person's face FCa. The size of the target image II is larger than the size of the assumed content image. For example, the number of pixels of the target image II in the vertical direction and the horizontal direction is 2000 to 6000 pixels. The size of the assumed content image is the size of (500×500) pixels, as described above.

In S305, the CPU 210 divides the target image II into a plurality of partial images PI (for example, PI1 to PI3 in FIG. 9A) to acquire a plurality of partial image data indicating the plurality of partial images PI. As shown in FIG. 9A, the partial images PI are arranged in a grid pattern on the target image II. The size of each partial image PI is the size of the assumed content image.

In S310, the CPU 210 inputs each of the plurality of partial image data generated in S305 into the transfer network TN as content image data CD, and generates a plurality of transferred image data TD corresponding to the plurality of partial image data. The transferred image TI indicated by the transferred image data TD is an image obtained by applying an illustration-like style to the partial image PI indicated by the corresponding partial image data.

Figure 9B:
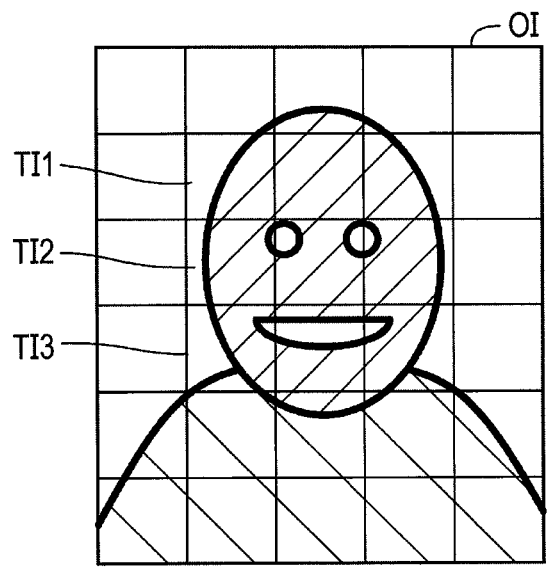

In S320, the CPU 210 generates one output image data by using the plurality of transferred image data TD. FIG. 9B shows an output image OI indicated by the output image data. The output image OI is an image in which an illustration-like style is applied to the target image II. In the output image OI, the plurality of transferred images TI represented by the plurality of transferred image data TD are arranged in a grid pattern. The positions where the transferred images TI are arranged in the output image OI are equal to the positions where the partial images PI corresponding to the transferred images TI are arranged in the target image II. For example, the transferred images TI1, TI2, and TI3 in FIG. 9B correspond to the partial images PI1, PI2, and PI3 in FIG. 9A, respectively. In this embodiment, the size of the partial image PI and the size of the transferred image TI are the same, and thus the size of the target image II and the size of the output image OI are the same.

In S330, the CPU 210 stores the generated output image data in the non-volatile storage device 230, and ends the image generation process. The saved output image data is provided for usage of the user. For example, the output image data is used to print the output image OI by using the printer 300. Alternatively, the output image data is used to display the output image OI on the display 250.

According to the embodiment described above, the transfer network TN is trained by using a plurality of data pairs each consisting of the content image data CD and the style image data SD (S110 to S135 in FIG. 3). The style image data SD is data generated by executing particular image processing (S205 to S230 in FIG. 4) on the corresponding content image data CD. The particular image processing of S205 to S230 of FIG. 4 is processing of applying a particular style (an illustration-like style in this embodiment) to the content image indicated by the content image data CD. As a result, the transfer network TN appropriately executes the style transfer process of applying a particular style realized by the particular image processing to the input image. Thus, the appearance of the style-transferred image can be improved by using the transfer network TN as described later. For example, conventionally, when the transfer network is trained for a certain style, one (single) style image data is normally used. In this embodiment, the transfer network TN is trained by using a plurality of style image data SD having a particular style, and thus the transfer network TN can effectively learn the particular style. As a result, the appearance of the style-transferred image can be improved. Further, the style image data SD is generated by executing particular image processing on the corresponding content image data CD. Thus, the style image data SD appropriately indicates the style that is to be applied when the content image data CD or image data similar to the content image data CD is input to the transfer network TN. Therefore, the transfer network TN effectively learns the feature of the style to be applied to the assumed input image data.

Further, for example, the transfer network TN generates transferred image data indicating an image having a natural appearance, as compared with the case where particular image processing is directly executed on the input image data. For example, depending on the combination of the particular image processing and the input image data, the boundary between the portion processed by the particular image processing (for example, an edge portion) and an unprocessed portion may have an unnatural appearance. Since the transfer network TN can be trained such that the output image is a smooth image by the training using the TV regularization term Ltv described above, for example, the unnatural appearance of the style-transferred image can be suppressed.

Further, the style image data SD having a particular style is generated by executing particular image processing on the corresponding content image data CD. Thus, a plurality of style image data SDs having the particular style can be easily prepared.

Further, according to the present embodiment, the plurality of content image data CD used for training are a plurality of partial image data out of the original image data indicating the original image Iin. The content image (for example, CI1 and CI2 in FIG. 6) represented by the content image data CD is partial image data indicating a plurality of first portions (for example, the corresponding regions Pin1 and Pin2 in FIG. 5A) that are different from each other in the original image Iin. The plurality of style image data SD is a plurality of partial image data out of the processed image data indicating the processed image It. The style image (for example, SI1 and SI2 in FIG. 6) represented by the style image data SD is the partial image data indicating a plurality of second portions (for example, the rectangular regions Pt1 and Pt2 in FIG. 5D) in the processed image It corresponding to the plurality of first portions of the original image Iin. The processed image data is data generated by executing particular image processing on the original image data (S205 to S230 in FIG. 4). As a result, the transfer network TN can be trained so that a particular style transfer by particular image processing can be appropriately reproduced by using the original image data and the processed image data having a large size. As a result, the transfer network TN can appropriately execute a style transfer process of a large-sized image for each partial image.

For example, if the transfer network TN is configured such that image data of an excessively large size can be input, the processing load of the style transfer of the transfer network TN becomes large, and the processing load of the training of the transfer network TN may become excessively large. According to this embodiment, the transfer network TN in which relatively small size image data is input can be trained so that the style of image data of a relatively large size can be reproduced for each partial image. For example, it is assumed that the transfer network TN is trained by using, as the style image data, only the image data obtained by reducing the processed image data to a size that can be input to the transfer network TN. In this case, since the feature of the style image, for example, the feature such as the thickness of the emphasized edge are reduced, the transfer network TN may not be able to properly learn the style that is originally desired to be learned. According to this embodiment, the transfer network TN can effectively learn the style of image data of a relatively large size, for each partial image.

Further, in the present embodiment, the size of each of a plurality of first portions (for example, the corresponding regions Pin1 and Pin2 in FIG. 5A) and a plurality of second portions (for example, the rectangular regions Pt1 and Pt2 in FIG. 5D) is equal to the image size of the input image data of the transfer network TN. Therefore, the partial image data of the original image data and the processed image data can be input to the transfer network TN as the content image data without enlarging or reducing the partial image data.

In the above embodiment, the particular image processing of S205 to S230 includes a process of extracting edges of an image (S220) and a particular process (S230) executed by using the extracted edges. As a result, the transfer network TN can be trained to reproduce the style obtained by the processing performed using the edges of the image.

Further, the probability that the data indicating a portion including an edge in the processed image It is acquired as the style image data SD is higher than the probability that the data indicating a portion not including an edge in the processed image It is acquired as the style image data SD (S240 in FIG. 4). That is, in the processed image It, the portion including the edge is preferentially selected as the style image over the portion not including the edge. As a result, the transfer network TN can be trained to better reproduce the particular style features achieved by the processing performed with the edges.

Further, in the above embodiment, the data pair of the content image data CD and the style image data SD includes a pair of reduced original image data and processed reduced image data. As a result, in the training process, the data pair corresponding to the entire original image Iin is used. Thus, the transfer network TN can be trained to also learn the style feature of the entire image.

Further, in the above embodiment, the processed reduced image data is image data generated by executing the particular image processing of S205 to S230 on the reduced original image data (S265 in FIG. 4). As a result, as compared with the case where the reduction process is executed on the processed image data to generate the style image data SD, the loss of the feature of the style to be reproduced due to the reduction process can be suppressed. For example, as described above, the loss of style features such as edge thickness from the style image data SD can be suppressed.

Further, in the above embodiment, the particular image processing of S205 to S230 is a process of processing a photographic image to a painting style (for example, an illustration-like style). Therefore, the transfer network TN can be trained to perform the process of transferring a photographic image to a painting style (for example, an illustration-like style).

Further, in the image generation process (FIG. 8) of the above embodiment, the CPU 210 that acquires the target image data in S300 is an example of a target image acquisition unit. The CPU 210 that acquires a plurality of partial image data from the target image data in S305 is an example of a partial acquisition unit. The CPU 210 that generates a plurality of transferred image data corresponding to the plurality of partial image data in S310 is an example of a transfer unit. The CPU 210 that generates output image data by using a plurality of transferred partial image data in S320 is an example of a generation unit. According to the image generating apparatus 200, the style transfer is performed for each part of the target image, without reducing the target image data larger than the size of the image data that can be input to the transfer network TN. Therefore, for example, as compared with the case where the target image data is reduced and input to the transfer network TN, the fine style features are more likely to be reflected in the output image OI, thereby improving the appearance of the style-transferred output image OI.

B. Modifications (1) In the above embodiment, the original image Iin and the target image II are photographic images including the face of a person, but the image is not limited to this and may be another image. For example, the original image Iin and the target image II may be images including a landscape, an animal, or a building, and not including a person. Further, the original image Iin and the target image II are not limited to photographs, but may be images showing paintings or illustrations.

(2) In the above embodiment, the style transfer process is a process of transferring a photographic image into a painting (specifically, illustration) style. Alternatively, the style transfer process may be, for example, a process of transferring a photograph or a painting showing a daytime landscape to a night view style. In this case, for example, the particular image processing for realizing the style includes, for example, a process of reducing the brightness of the image.

(3) Further, the style transfer process of the above embodiment may be used as a preprocessing executed on image data when embroidery data is generated from the image data indicating a photograph. The embroidery data is data that controls a sewing machine that sews an embroidery pattern on a cloth by sewing threads of a plurality of colors on the cloth, and indicates an embroidery pattern to be sewn. It is preferable that the number of colors of thread used for sewing embroidery patterns (for example, dozens of colors) be less than the number of colors appearing in a photograph (for example, approximately 10 million colors), and that the outline be clear. For this reason, when embroidery data is generated from image data showing a photograph, preprocessing for transferring a photograph into a painting style is performed. Such preprocessing is generally performed by an experienced worker using an image processing program (also called photo retouching software). By using the style transfer process of this embodiment as preprocessing, the preprocessing can be executed without relying on an experienced worker.

(4) In the training image generation process of the above embodiment, a plurality of data pairs of the content image data CD and the style image data SD are generated from one original image data. Alternatively, only one data pair may be generated from one original image data, the only one data pair including original image data which is used as the content image data CD and processed image data which is generated using the original image data and is used as the style image data SD. In this case, if the size of the original image data is different from the size of the image data CD to be generated, a process of appropriately adjusting the size may be executed.

(5) In the above embodiment, the particular image processing that realizes the style includes, for example, an edge extraction process and an edge density correction process. Alternatively, the particular image processing may include a process of extracting a feature portion of an image other than an edge, for example, a process of identifying an object having the highest brightness or chroma. In this case, the particular image processing may include a process executed using a feature portion other than an extracted edge, for example, a process of changing the color of the object having the highest brightness or chroma or a process of adjusting the color of another object or the background according to the color of the object having the highest brightness or chroma.

(6) In the training image generation process of the above embodiment, the style image data SD corresponding to the entire original image Iin is generated by reducing the original image data and then executing particular image processing of S205 to S230 in FIG. 4 on the reduced original image data. Alternatively, the style image data SD corresponding to the entire original image Iin may be generated by reducing the processed image data.

(7) The configuration of the machine learning model (the transfer network TN or the loss calculation network LN) of the above embodiment is an example, and is not limited to this. For example, the transfer network TN may be an autoencoder including an encoder and a decoder. Further, the loss calculation network LN may be an identification network different from VGG19, for example, VGG16 or AlexNet. Further, in the transfer network TN and the loss calculation network LN, the number of layers such as the convolution layer may be changed as appropriate. In addition, the post-processing executed for the values output in each layer may be changed as appropriate. For example, as the activation function used for post-processing, any function such as ReLU, LeakyReLU, PReLU, Softmax, and sigmoid may be used. In addition, processes such as batch normalization and dropout may be appropriately added or omitted as post-processing.

(8) The specific configuration of the loss function in the training of the transfer network TN of the above embodiment may also be changed as appropriate. For example, in the calculation of the content loss Lc, a cross entropy error or a mean absolute error may be used instead of the Euclidean distance.

(9) The hardware configuration of the training apparatus 100 and the image generating apparatus 200 in FIG. 1 is an example, and is not limited thereto. For example, the processor of the training apparatus 100 is not limited to the CPU, but may be a GPU (Graphics Processing Unit), an ASIC (application specific integrated circuit), or a combination of these and a CPU. Further, the training apparatus 100 and the image generating apparatus 200 may be a plurality of computers (for example, so-called cloud servers) capable of communicating with each other through a network.

(10) In the above embodiment, a part of the configuration realized by the hardware may be replaced with software, and conversely, a part or all of the configuration realized by the software may be replaced with hardware. For example, the transfer network TN and the loss calculation network LN may be realized by a hardware circuit such as an ASIC (Application Specific Integrated Circuit) instead of the program module.

While the disclosure has been described in detail with reference to the above aspects thereof, it would be apparent to those skilled in the art that various changes and modifications may be made therein without departing from the scope of the claims. The disclosure also includes its equivalents.

What is claimed is:

1. A non-transitory computer-readable storage medium storing a set of program instructions for an image generating apparatus, the set of program instructions, when executed by a controller of the image generating apparatus, causing the image generating apparatus to perform:

acquiring input image data; and executing a style transfer process on the input image data by using a trained machine learning model, thereby generating transferred image data, the machine learning model being trained by using a plurality of data pairs each including content image data and style image data corresponding to the content image data, the style image data being generated by executing particular image processing on the corresponding content image data, the particular image processing being a process of applying a particular style to a content image indicated by the content image data, wherein the plurality of data pairs includes a plurality of content image data and a plurality of style image data;

wherein the plurality of content image data includes a plurality of particular partial image data included in particular image data indicating a particular image, the plurality of particular partial image data indicating a plurality of first portions in the particular image, the plurality of first portions being partial regions in the particular image, the partial regions being different from each other, each of the plurality of first portions being smaller than the particular image;

wherein the plurality of style image data includes a plurality of processed partial image data included in processed image data indicating a processed image, the plurality of processed partial image data indicating a plurality of second portions in the processed image, the plurality of second portions being the partial regions corresponding to the plurality of first portions in the particular image, each of the plurality of second portions being smaller than the processed image; and wherein the processed image data is data generated by executing the particular image processing on the particular image data.

2. The non-transitory computer-readable storage medium according to claim 1, wherein a size of each of the plurality of first portions and the plurality of second portions is equal to a size of an image indicated by the input image data.

3. The non-transitory computer-readable storage medium according to claim 1, wherein the particular image processing includes:

a first process of extracting a feature portion of an image; and a second process executed by using the extracted feature portion; and wherein, in the processed image, portions including the feature portion are preferentially selected as the plurality of second portions over portions not including the feature portion.

4. The non-transitory computer-readable storage medium according to claim 1, wherein the plurality of data pairs includes a pair of reduced particular image data and reduced processed image data, the reduced particular image data being the content image data, the reduced processed image data being the style image data;

wherein the reduced particular image data is generated by executing a reduction process on the particular image data, the reduction process being a process of reducing a size of an image to a size of an image indicated by the input image data; and wherein the reduced processed image data is either one of image data generated by executing the particular image processing on the reduced particular image data and image data generated by executing the reduction process on the processed image data.

5. The non-transitory computer-readable storage medium according to claim 4, wherein the reduced processed image data is the image data generated by executing the particular image processing on the reduced particular image data.

6. The non-transitory computer-readable storage medium according to claim 1, wherein the particular image processing includes:

a first process of extracting a feature portion of an image; and a second process executed by using the extracted feature portion.

7. The non-transitory computer-readable storage medium according to claim 6, wherein the first process is a process of extracting an edge.

8. The non-transitory computer-readable storage medium according to claim 1, wherein the particular image processing is a process of transferring a photographic image to an illustration-like image.

9. The non-transitory computer-readable storage medium according to claim 1, wherein the plurality of data pairs is obtained by:

(a) randomly setting a partial region in the processed image;

(b) determining whether to acquire an image in the partial region based on an amount indicating a feature portion in the partial region;

(c) in response to determining that the image in the partial region is to be acquired, acquiring, as one of the plurality of processed partial image data, partial image data indicating the image in the partial region in the processed image, the partial region serving as one of the plurality of second portions; and acquiring, as one of the plurality of particular partial image data, partial image data indicating the image in a corresponding partial region in the particular image, the corresponding partial region serving as one of the plurality of first portions, wherein a position of each of the plurality of second portions in the processed image is same as a position of a corresponding one of the plurality of first portions in the particular image; and (d) repeating (a) to (c) until a particular number of data pairs are acquired.

10. A training method of a machine learning model configured to execute a style transfer process on input image data to generate transferred image data, the method comprising:

acquiring particular image data;

generating processed image data corresponding to the particular image data, the processed image data being generated by executing particular image processing on the particular image data, the particular image processing being a process of applying a particular style to an image indicated by the particular image data;

acquiring a plurality of style image data based on the processed image data;

acquiring a plurality of content image data based on the particular image data, the plurality of content image data corresponding to respective ones of the plurality of style image data; and adjusting a plurality of parameters of the machine learning model by using a plurality of data pairs, each of the plurality of data pairs including one of the plurality of content image data and a corresponding one of the plurality of style image data, wherein the plurality of data pairs includes a plurality of content image data and a plurality of style image data;

wherein the plurality of content image data includes a plurality of particular partial image data included in particular image data indicating a particular image, the plurality of particular partial image data indicating a plurality of first portions in the particular image, the plurality of first portions being partial regions in the particular image, the partial regions being different from each other, each of the plurality of first portions being smaller than the particular image;

wherein the plurality of style image data includes a plurality of processed partial image data included in processed image data indicating a processed image, the plurality of processed partial image data indicating a plurality of second portions in the processed image, the plurality of second portions being the partial regions corresponding to the plurality of first portions in the particular image, each of the plurality of second portions being smaller than the processed image; and wherein the processed image data is data generated by executing the particular image processing on the particular image data.

11. The training method of claim 10, wherein the plurality of data pairs is obtained by:

(a) randomly setting a partial region in the processed image;

(b) determining whether to acquire an image in the partial region based on an amount indicating a feature portion in the partial region;

(c) in response to determining that the image in the partial region is to be acquired, acquiring, as one of the plurality of processed partial image data, partial image data indicating the image in the partial region in the processed image, the partial region serving as one of the plurality of second portions; and acquiring, as one of the plurality of particular partial image data, partial image data indicating the image in a corresponding partial region in the particular image, the corresponding partial region serving as one of the plurality of first portions, wherein a position of each of the plurality of second portions in the processed image is same as a position of a corresponding one of the plurality of first portions in the particular image; and (d) repeating (a) to (c) until a particular number of data pairs are acquired.

12. An image generating apparatus comprising:
a controller; and
a memory storing instructions, the instructions, when executed by the controller, causing the image generating apparatus to perform:

acquiring target image data indicating a target image;

dividing the target image into a plurality of portions to acquire, as input image data, a plurality of partial image data indicating the plurality of portions;

inputting each of the plurality of partial image data to a machine learning model to generate a plurality of transferred partial image data corresponding to the plurality of partial image data, the machine learning model being a model configured to execute a style transfer process of applying a particular style to an image indicated by the input image data; and generating output image data indicating an output image by using the plurality of transferred partial image data, the output image being obtained by applying the particular style to the target image, wherein the machine learning model is trained by using a plurality of data pairs each including content image data and style image data corresponding to the content image data;

wherein the style image data is generated by executing particular image processing on the corresponding content image data;

wherein the particular image processing is a process of applying the particular style to a content image indicated by the content image data;

wherein the plurality of data pairs includes a plurality of content image data and a plurality of style image data;

wherein the plurality of content image data includes a plurality of particular partial image data included in particular image data indicating a particular image, the plurality of particular partial image data indicating a plurality of first portions in the particular image, the plurality of first portions being partial regions in the particular image, the partial regions being different from each other, each of the plurality of first portions being smaller than the particular image;

wherein the plurality of style image data includes a plurality of processed partial image data included in processed image data indicating a processed image, the plurality of processed partial image data indicating a plurality of second portions in the processed image, the plurality of second portions being the partial regions corresponding to the plurality of first portions in the particular image, each of the plurality of second portions being smaller than the processed image; and wherein the processed image data is data generated by executing the particular image processing on the particular image data.

13. The image generating apparatus according to claim 12, wherein a size of each of the plurality of first portions and the plurality of second portions is equal to a size of an image indicated by the input image data.

14. The image generating apparatus according to claim 12, wherein the particular image processing includes:
a first process of extracting a feature portion of an image; and
a second process executed by using the extracted feature portion; and
wherein, in the processed image, portions including the feature portion are preferentially selected as the plurality of second portions over portions not including the feature portion.

15. The image generating apparatus according to claim 12, wherein the plurality of data pairs includes a pair of reduced particular image data and reduced processed image data, the reduced particular image data being the content image data, the reduced processed image data being the style image data;
wherein the reduced particular image data is generated by executing a reduction process on the particular image data, the reduction process being a process of reducing a size of an image to a size of an image indicated by the input image data; and
wherein the reduced processed image data is either one of image data generated by executing the particular image processing on the reduced particular image data and image data generated by executing the reduction process on the processed image data.

16. The image generating apparatus according to claim 15, wherein the reduced processed image data is the image data generated by executing the particular image processing on the reduced particular image data.

17. The image generating apparatus according to claim 12, wherein the particular image processing includes:
a first process of extracting a feature portion of an image; and
a second process executed by using the extracted feature portion.

18. The image generating apparatus according to claim 17, wherein the first process is a process of extracting an edge.

19. The image generating apparatus according to claim 12, wherein the particular image processing is a process of transferring a photographic image to an illustration-like image.

20. The image generating apparatus of claim 12, wherein the plurality of data pairs is obtained by:
(a) randomly setting a partial region in the processed image;
(b) determining whether to acquire an image in the partial region based on an amount indicating a feature portion in the partial region;
(c) in response to determining that the image in the partial region is to be acquired, acquiring, as one of the plurality of processed partial image data, partial image data indicating the image in the partial region in the processed image, the partial region serving as one of the plurality of second portions; and acquiring, as one of the plurality of particular partial image data, partial image data indicating the image in a corresponding partial region in the particular image, the corresponding partial region serving as one of the plurality of first portions, wherein a position of each of the plurality of second portions in the processed image is same as a position of a corresponding one of the plurality of first portions in the particular image; and (d) repeating (a) to (c) until a particular number of data pairs are acquired.

* * * * *